United States Patent
Tolley et al.

(10) Patent No.: US 7,234,271 B1
(45) Date of Patent: Jun. 26, 2007

(54) ANIMALIAN POT COVER INCORPORATING A DETACHABLE MINIATURE GREENHOUSE

(76) Inventors: Andrew M. Tolley, 49 Barnsdale Rd., East Providence, RI (US) 02914; George H. Reekie, 17 Pell St., Newport, RI (US) 02840

( * ) Notice: Subject to any disclaimer, the term of this patent is extended or adjusted under 35 U.S.C. 154(b) by 255 days.

(21) Appl. No.: 10/938,697

(22) Filed: Sep. 11, 2004

Related U.S. Application Data

(60) Provisional application No. 60/503,856, filed on Sep. 17, 2003.

(51) Int. Cl.
*A01G 13/02* (2006.01)

(52) U.S. Cl. ............................................. 47/29.5; 47/69

(58) Field of Classification Search ............... 47/28.1, 47/1.01 R, 29.1, 29.5, 69, 66.1; 446/73
See application file for complete search history.

(56) References Cited

U.S. PATENT DOCUMENTS 310,982 A * 1/1885 Brown ........................ 47/29.5

(Continued)

FOREIGN PATENT DOCUMENTS

GB  002088183 A  6/1982

(Continued)

OTHER PUBLICATIONS

Internet Source : www.weefolk.com/pipcat.htm.

(Continued)

*Primary Examiner*—Teri Pham Luu
*Assistant Examiner*—Susan C. Alimenti

(57) ABSTRACT

A pot cover that is comprised of detachable components and which can be used in combination with any conventional garden pot or any other suitable container, for purposes of facilitating the propagation of seedlings or seed germination, and which also resembles a novel animalian figure appearing to be living in the pot. The sections (02) and (04) of the pot cover connect together via clips (06) or other conventional connecting device to enable the sections to be easily connected and disconnected from each other and from the pot as required. The user would fill a pot with soil medium, and add seeds and water. Then connect the sections of the pot cover together, and then insert the connected sections of the pot cover into the upper rim of the pot, so that the pot cover sits securely on top of the pot, with the outside bottom edge (08) and (09) of the pot cover abutting the inner top rim of the pot. The user can, when desired, easily remove any or all sections of the pot cover, to facilitate watering and general care of the seeds or seedlings. The rear section of the pot cover (04) would usually be partially transparent to allow light and heat to enter the pot, improving propagation of seeds planted in a soil medium in the pot. The user can easily remove the rear section (or sections) of the pot cover to water the seeds as required, and then easily replace the rear section of the pot cover to maintain the greenhouse type benefits that the pot cover provides to the seeds or seedlings, namely increased humidity, increased moisture, a more constant temperature, and general protection from external elements. Eventually, once the seeds have sprouted and the seedlings are of sufficient height, the user can then permanently remove or relocate the rear section of the pot cover to enable the sprouts to grow further. The front section (02) can remain in place, to maintain the semblance of an animalian character living in a pot, and once the seedlings have reached sufficient height they will resemble the hair of the animalian figure. Or alternatively, the user can remove all sections of the pot cover and re-use them for repeat propagation on any other pot that contains newly planted seeds. Thus a considerably more versatile and attractive pot cover is provided, that provides greenhouse benefits for seeds and seedlings in a pot, with additional resulting benefits: namely a novel and humorous animalian character so formed by the separate components of the plant cover, plus additional operational advantages for watering and fertilization via the easy removal of one or more components of the plant cover, without adversely impacting the novel look of the animalian character.

2 Claims, 4 Drawing Sheets

U.S. PATENT DOCUMENTS

| | | | |
|---|---|---|---|
| 2,011,897 A * | 8/1935 | Hauck | 47/29.3 |
| 3,704,545 A * | 12/1972 | Van Reisen | 47/69 |
| 3,869,828 A * | 3/1975 | Matsumoto | 47/84 |
| 4,143,191 A * | 3/1979 | Chavis | 428/13 |
| RE30,531 E * | 3/1981 | Spector | 47/69 |
| 4,914,860 A | 4/1990 | Richardson | |
| 4,941,572 A * | 7/1990 | Harris | 206/423 |
| 5,239,775 A * | 8/1993 | Landau | 47/72 |
| 5,549,500 A | 8/1996 | Manoah | |
| 5,950,363 A * | 9/1999 | Rotondo | 47/84 |
| 6,061,953 A * | 5/2000 | Chubb et al. | 47/31.1 |
| 6,298,599 B1 | 10/2001 | Weiner | |
| 6,321,436 B1 | 11/2001 | Weder | |

FOREIGN PATENT DOCUMENTS

| | | |
|---|---|---|
| GB | 002185373 A | 7/1987 |
| JP | 410150857 A | 6/1998 |
| JP | 02000014249 A | 1/2000 |
| JP | 02001190855 A | 7/2001 |
| JP | 02001340005 A | 12/2001 |

OTHER PUBLICATIONS

Internet Source : http://www.happyfaceterracotta.com/site/679290/page/45031.

Internet Source : http://www.hobbycraft.co.uk/ideas/idea__13.htm.

* cited by examiner

ANIMALIAN POT COVER INCORPORATING A DETACHABLE MINIATURE GREENHOUSE

CROSS-REFERENCE TO RELATED APPLICATIONS

This application claims the benefit of PPA Application No. 60/503,856 filed on Sep. 17, 2003 by the present inventors.

FEDERALLY SPONSORED RESEARCH

None

SEQUENCE LISTING

None

BACKGROUND OF THE INVENTION—FIELD OF INVENTION

This invention relates to covers for individual pots, specifically pot covers used for the purpose of enhancing seed germination and seedling growth.

BACKGROUND OF THE INVENTION

Greenhouses are well known for their ability to hasten plant growth, and also provide protection for seeds and emerging seedlings from heat, cold, frost, and precipitation. Various pot covers have been devised to provide seeds, seedlings, and plants with individual greenhouse benefits. However there are no pot covers available for individual pots where the cover is comprised of detachable sections such that when the separate sections are connected or disconnected, the benefits of a greenhouse are attained, in combination with (and integral to) forming the novel appearance of an animalian character.

There are various examples of covers for individual plants and/or pots that attempt to provide either the benefits of a greenhouse, or alternatively the benefits of a novel animalian character. An example of an invention providing greenhouse benefits is U.S. Pat. No. 4,914,860 to Richardson (1990) which is a cover for a plant-pot. However that cover surrounds and encloses the entire pot, and is more for protective purposes. It does not lend itself to providing the added benefit of forming an animalian character, and does not actually provide any means for enhancing germination, nor does it provide easy access for care of the plant, without removing the entire cover.

The Japanese Pat. No. JP02001340005A to Iseya (2001) attempts to achieve a novel effect of enabling seed germination via the use of separate components of an encased growing medium vessel. However, the components are not interconnected and are instead layered over each other. Seed germination is only achieved by literally tearing open the outer surface covering material of its individual outer shell, thereby destroying the original product and rendering it suitable for a "one off" use only. The Iseya patent does not include the additional benefit of further novel enhancement due to the inherent incorporation of an integral animalian character.

U.S. Pat. No. 6,321,436 to Weder (2001) includes a cover for a flower pot that is comprised of a sheet of material to provide a protective covering. However the Weder patent does not include a detachable greenhouse section or sections, nor does it provide any novel enhancement to the pot. Similarly, Japanese Pat. No. JP410150857A to Sanmei Denki (1998), Japanese Pat. No. JP02000014249A to Takeo (2000), UK Pat. No. GB002185373A to Fernando (1987), and UK Pat. No. GB002088183A to Barton (1982) all utilize a type of cover for an individual pot in order to provide a greenhouse propagating effect. However, none of these inventions utilizes the greenhouse cover as itself being an integral and detachable animalian character, which can remain in place to protect the plant and to help with propagation, and which incorporates one or more sections that can be easily detached or relocated once plants have propagated, without adversely impacting the original animalian look of the invention.

Other inventions have focused on attempts to create a unique animalian character with the visual impact of growing hair in the form of a plant. U.S. Pat. No. 5,549,500 to Manoah (1996) is an animalian figurine that contains a nutrient material and a bed of plant seeds. However, the plant seeds are positioned directly adjacent to a "scalp portion" covering the nutrient so that the sprouts then grow directly through a scalp formed by a mesh covering, in order to simulate hair. There is no utilization made of a novel greenhouse cover to assist in propagation or to otherwise improve the look and functionality of the animalian figurine. In addition, the type of plant that can be grown in this manner is limited to grass and other similar plants which can easily sprout through a mesh covering.

U.S. Pat. No. 6,298,599 to Wiener, Molino, and Troghi (2001) is a three-dimensional, decorative sculptured-plant vase having the appearance of a sculptured head and a sculptured torso for receiving in the sculptured head a plant with leaves, wherein the plant leaves also appear to be the hair of the sculptured head. In this case, the decorative sculpture is designed into the plant vase itself, and a plant vase body and plant vase base are detachable from each other for the purpose of water overflow, which is a similar process utilized by most standard pots and pot bases. This invention creates an image of a hair-like appearance once planted seedlings have emerged and grown to suitable height. However, in the Wiener et. al. patent the animalian character is represented by the plant vase itself rather than the pot cover, and there is no detachable pot-cover sections, and furthermore there is no advantage of a greenhouse effect to assist with propagation.

In addition to the above design by Wiener et al, a detailed public internet search reveals a considerable demand for plant vases and pots with sculptural animalian designs. Examples can be sourced at http://www.happyfaceterracotta.com/site/679290/page/45031, and at http://www.hobby-craft.co.uk/ideas/idea__13.htm). These and various other designs illustrate unique animalian garden type characters, however all of these are molded directly onto the outer surface of a pot, so that that each animalian character is actually represented by a pot itself. These products provide the benefits of an animalian character appearance, but do not significantly improve this effect by enabling a character to be viewed as if it is "living" in, and appearing to be emerging from a pot. In addition, these type of animalian characters are not formed from integral and detachable sections that create a greenhouse effect for the purpose of enhancing the propagation of seeds and seedlings planted in the standard pot.

There is also prior public art which depicts characters "living" on the edge of a container, for example "Mug Huggers" (refer to http://www.weefolk.com/pipcat.htm), which are characters made out of pottery which can sit on the edge of a mug or a pot. These characters partially provide the appearance of an animalian character living in a pot, but do not provide any means to assist with plant propagation. They are not manufactured such that when the individual components are connected and attached to a pot, an additional benefit of a greenhouse effect can be achieved.

The following Japanese Pat. No. JP0200190855A to Takahashi (2001) provides a plant, which resembles hair on the head of a doll. Again this creates a novel look, but there is no utilization of a pot cover with detachable sections, nor is there any capacity to provide the benefits of a greenhouse.

In conclusion, insofar as we are aware, there is no formerly developed pot cover for individual pots which is manufactured from one or more detachable sections that, when the said sections are connected, will act to provide the benefits of a miniature greenhouse for seed propagation in a plant-pot, with the sections being easily removed or relocated for access to tend to seeds and seedlings germinating and sprouting in the pot, and that also the pot cover has the added benefit of forming the shape of an animalian character for which the detachable sections of the pot cover are also integral components of said character.

BACKGROUND OF THE INVENTION—OBJECTS AND ADVANTAGES

Our invention provides all of the following objects and advantages in combination:

(a) to provide, when the pot cover sections are combined, a miniature greenhouse to benefit germination of seeds and/or propagation of seedlings planted in a pot for either indoor or outdoor use. These benefits are namely faster seed germination, faster seedling propagation, protection of the seeds and emerging seedlings from temperature fluctuations and other external elements, creation of a more humid environment within the greenhouse chamber, and to assist with retention of moisture;

(b) to enable pot cover sections to be combined and attached to a conventional pot such that the sections resemble humanoid or animal features, herein referred to as animalian features;

(c) to enable one or more sections of the miniature greenhouse to be easily removed or relocated to facilitate easy access to seedlings for ongoing care such as watering and fertilization;

(d) to provide for easy connection and disconnection of the separate sections of the pot cover itself, to facilitate care of the seeds/seedlings including watering and fertilization, without damage to the seeds/seedlings or inconvenience to the user;

(e) to enable a section or section of the greenhouse to be easily removed or relocated, once seeds or seedlings planted in the said pot have sprouted to a point where they have outgrown the confines of the fully enclosed miniature greenhouse, such that the animalian character formed by the pot cover still maintains its general features via the remaining section or sections, but with the additional benefit that the animalian character also then appears to be growing hair;

(f) to incorporate a miniature greenhouse cover that is integral to and defines the shape and design of an animalian character;

(g) to maintain a novel and humorous element throughout the entire plant propagation phases from seed, to seedling, to full growth, in that the pot cover also has animalian features, and appears to resemble an animalian character that is living in a pot that the miniature greenhouse pot cover has been connected to, and furthermore that once the seedlings begin to grow to a sufficient height they will begin to resemble new hair growth of the animalian character;

(h) to provide an interesting yet practical pot cover that can be mass produced very economically;

(i) to enable the pot cover to be re-usable;

(j) to enable the pot cover to be produced in a medium such as plastic, in such a way that it maintains a fun, novel, and attractive appearance, whilst being able to withstand harsh treatment without damage, for example if dropped the individual components will not break;

(k) to enable seeds and/or seedlings to be grown and to gain all the above benefits of the pot cover, without limitation to the type of plant grown, or any hindrance of the growth of the seedlings.

Still further objects and advantages will become apparent from a consideration of the ensuing description and drawings.

SUMMARY

The invention is a pot cover that is comprised of detachable sections and when the sections are connected, functions as a miniature greenhouse to facilitate propagation of seeds and seedlings, and also provides a novel effect in that the combined sections resemble the shape of an animalian character. The invention enables the user to easily attach the said sections to the top of a pot after first filling the said pot with a soil medium and seeds, and adding water to the soil medium. The said invention can either be connected to a pot by a means of a conventional clip-in attachment or by other conventional means such as a push in fit (jam fit). Once attached, the said invention forms an enclosed capsule over the top of the soil and seeds that are in the pot. The rear detachable section of the invention enables light and/or warmth to be admitted, while helping to ensure that moisture and temperature within the resulting capsule is maintained at relatively constant levels compared to the external ambient environment, effectively operating as a miniature greenhouse. The various greenhouse sections of the invention are detachable from the pot and from each other. The front section or sections of the invention has facial-like humanoid or animalian features and the rear section or sections of the invention has scalp-like humanoid or animalian features. Both the front and rear greenhouse sections, when connected to each other and to any conventional pot, create an interconnected and novel miniature greenhouse with animalian features. Easy access for plant care is achieved via the removable pot cover sections. The pot cover components are also fully re-usable.

DRAWINGS

DRAWINGS—REFERENCE NUMERALS

Figure 1:
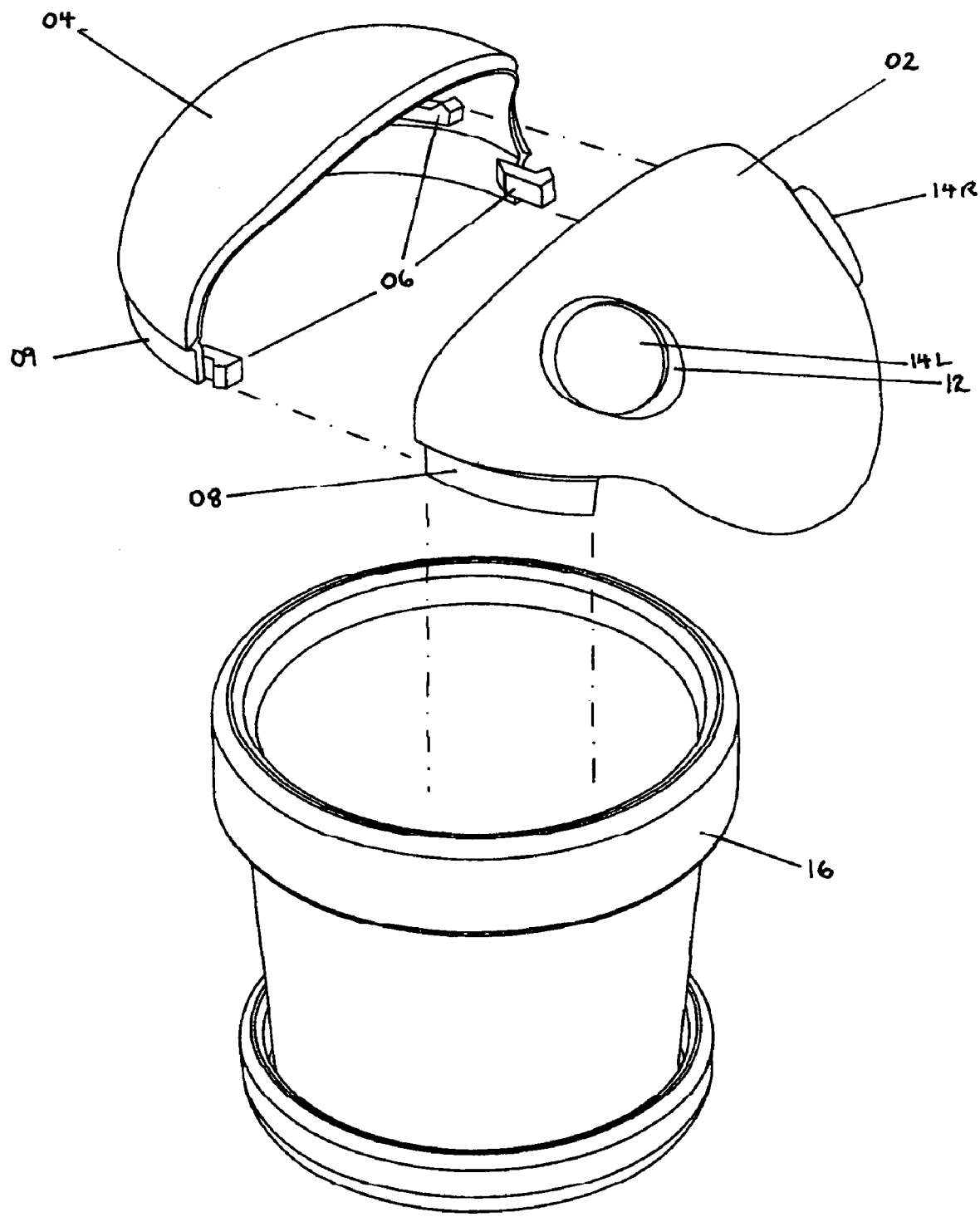
FIG. 1 is an exploded perspective left-front three quarter view of a pot cover constructed in accordance with the invention, showing the separate front and rear components of the pot cover, which corresponds to a facial section and a rear scalp section respectively. A conventional pot is also shown to indicate how the pot cover would connect to said pot.

02 Front (facial) section of pot cover
04 Rear (scalp) section of pot cover
06 Connecting snaps for attachment of front section of pot cover to rear section of pot cover
08 Connecting snaps on front section of pot cover for attachment to pot
09 Lower rim at base of rear section of pot cover
12 Eye sockets
14L Left eye
14R Right eye
15 Nose
16 Conventional pot
18 Cross-sectional width of pot cover
20 Convex exterior
22 Concave interior
28 Join line between front and rear section of pot cover

DETAILED DESCRIPTION

FIG. 1 is an exploded perspective left-front three quarter view of a basic version of the pot cover constructed in accordance with the invention. A pot 16, which is not part of the invention, is shown for illustration purposes. FIG. 1 illustrates separate front (facial) section 02 and rear (scalp) section 04 components of the pot cover. A version of connecting snaps 06 is shown for illustrative purposes, as one of various available possible conventional means to attach the separate pot cover sections together securely and in a flush manner. Snaps 08 are shown to illustrate a means of helping to ensure that the connected sections will remain lodged into any suitable sized pot container. Such snaps may vary in type and quantity, provided that they adequately secure the separate components together, whilst also ensuring that the end user can easily separate the sections 02 and 04. The front section 02 of the pot cover is opaque and contains eye sockets 12 for the attachment of eyes 14L and 14R. The entire rear section 04 can be transparent enough to allow light to pass through, though a non-transparent section can also be used, to provide a suitable greenhouse effect for seed germination. The pot cover will then act as a miniature greenhouse, facilitating propagation of seeds planted in soil in the pot 16. The seeds will then sprout successfully into seedlings (not shown). The rear section 04 of the pot cover can be easily removed from both the front section 02 and the standard pot 16 at any time, without negatively impacting the growth of the seedlings, while the front section 02 of the pot cover can remain secured in place to maintain the appearance of an animalian creature living inside the pot 16. During propagation, the rear section 04 is easily removed and reconnected for watering and fertilization purposes, and eventually once the seedlings are of a suitable height, the rear section 04 can be removed completely. The front section 02 can also be removed at any time if necessary, or alternatively it can be remain attached to the standard pot 16.

Figure 2:
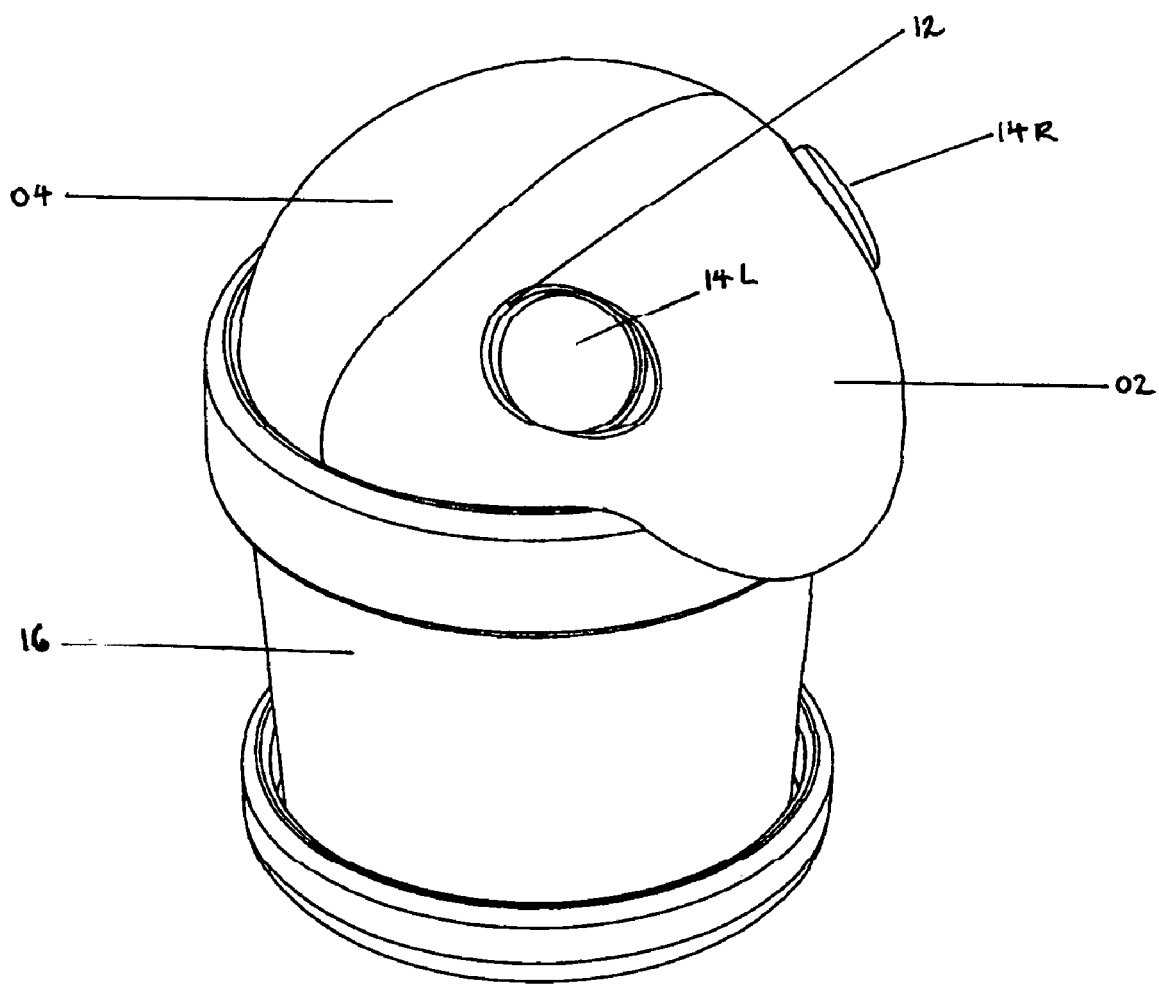
FIG. 2 is a perspective left-front three quarter view of the pot cover of FIG. 1, showing components after being connected to a conventional pot.

FIG. 2 is a perspective left-front three quarter view of the pot cover of FIG. 1, showing components of the pot cover connected together and attached to a conventional pot 16. The pot cover comprises at least two parts, front section 02 and rear section 04 connected to each via means of a basic latching mechanism using snaps 06. When connected they form the shape of a complete animalian head, including eye sockets 12 and eyes 14L and 14R, such as to give the effect that the animalian head is peering out of the top of a standard pot. The front section 02 forms the face of the animalian head, whilst the rear section 04 forms the scalp of the animalian head. The front section 02 is opaque whilst the rear section 04 is transparent enough to allow light to pass through (though it may also be non-transparent and be suitable for seed germination, as heat will still be retained). Note that once fully connected and attached to a pot, the pot cover presents the appearance of an animalian character living inside a pot 16. The pot cover also forms a protective miniature greenhouse to facilitate propagation of seeds or seedlings planted inside the pot 16, provided that the pot contains a soil medium that is regularly watered.

Figure 3:
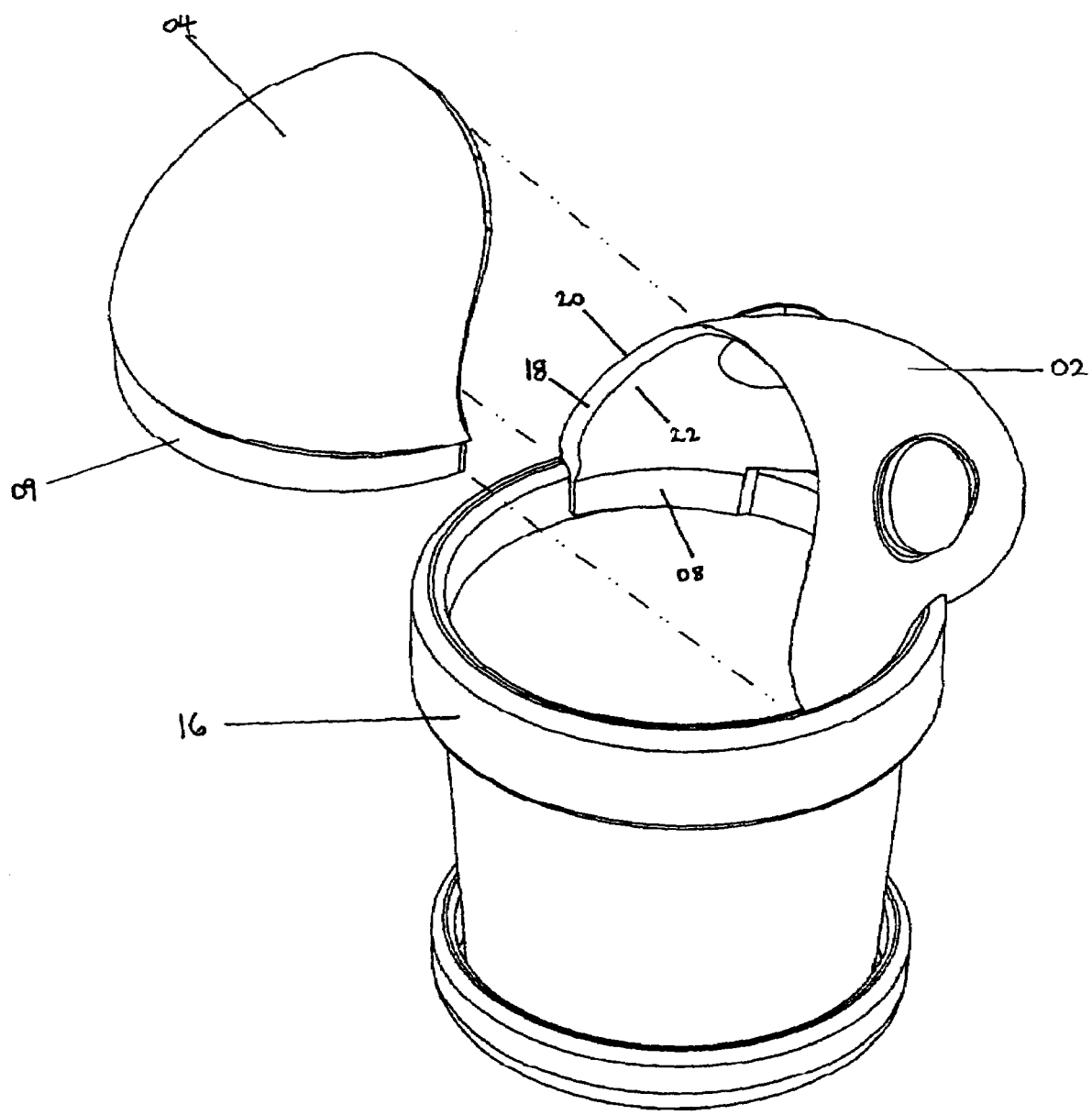
FIG. 3 is a perspective right-rear three quarter view of the pot cover, with rear section shown in exploded perspective, and connected to a conventional pot.

FIG. 3 is a perspective right-rear three quarter view of the pot cover of FIGS. 1 and 2, and is shown attached to a (separate) pot 16. Both the front section 02 and the rear section 04 are convex 20 on the outside and concave 22 on the inside, such that when connected together will form a hollow space under the invention that is sufficient in size to enable the invention to function as a miniature greenhouse. The two sections are of thin cross-sectional width 18. The pot cover front section 02 is connected to a conventional pot 16 via means of a basic latching mechanism that comprised of snaps 08, though can be connected via any conventional connecting mechanism suitable for the purpose of connecting the pot cover sections to a pot.

Figure 4:
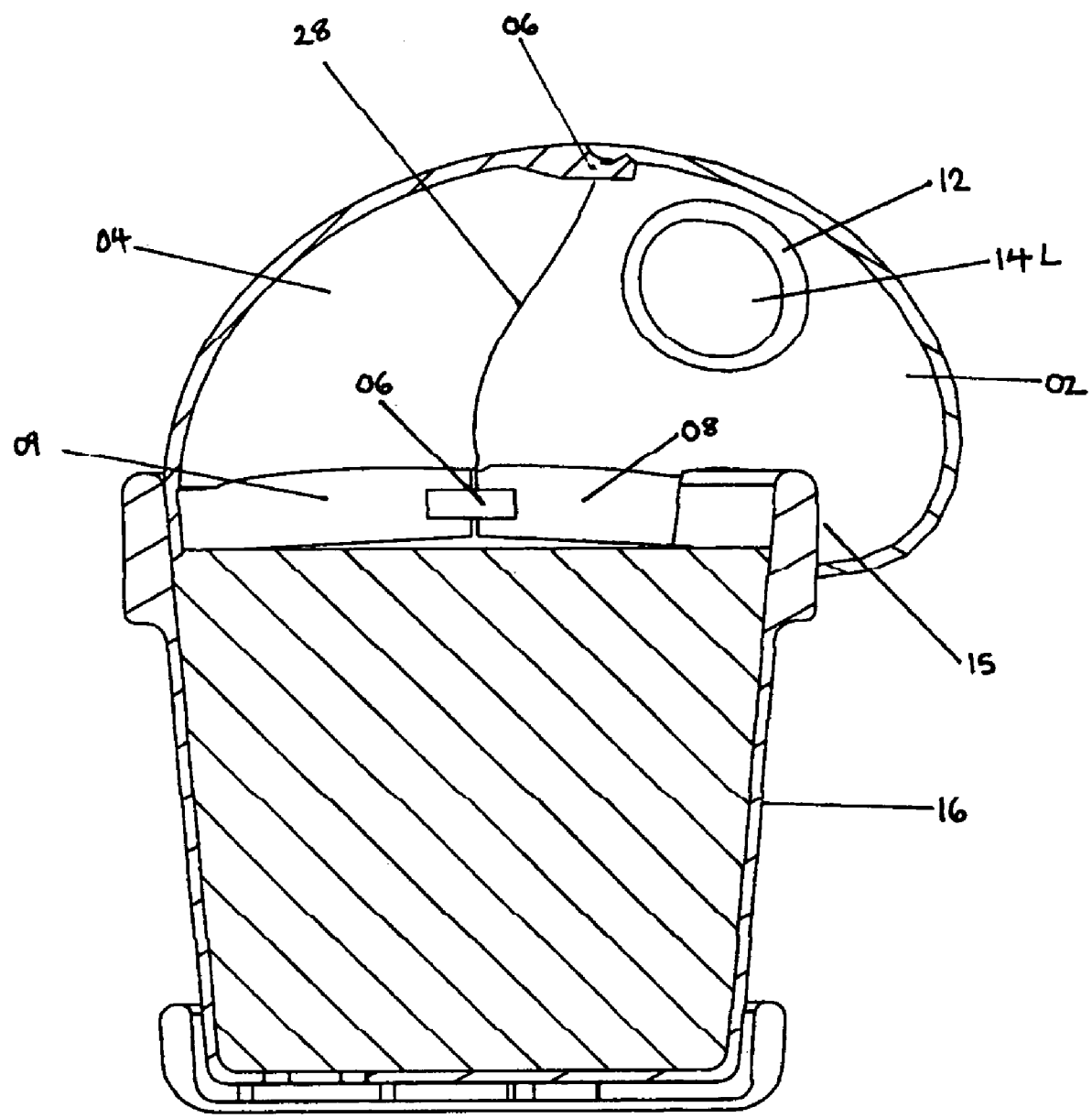
FIG. 4 is a left cross-sectional view of the pot cover, shown connected to a conventional pot, also in same cross-sectional view.

FIG. 4 is a left cross-sectional view of the pot cover, and includes a conventional pot 16, which is not part of the invention, but is shown for illustrative purposes. The pot cover comprises front section 02 and rear section 04 connected to each via basic conventional latching mechanisms utilizing snaps 06. The components of the pot cover fit snugly together to enhance the final appearance, as illustrated by the close-fitting join line 28. The pot cover front section 02 is connected to the pot 16 via means of a basic latching mechanism. The latching mechanism as illustrated uses snaps 08, though any conventional latching mechanism may be utilized to connect the pot cover components together securely. The pot cover rear section 04 shows an indented lower rim section 09 to enable secure insertion and stable connection in the upper rim of a standard pot 16. When connected to each other and to a standard pot 16, the front section 02 and rear section 04 of the pot cover combine to form a miniature greenhouse in the shape of an animalian character, with the effect being that the animalian head is peering out of the top of a pot 16. The front section 02 forms the face of the animalian head, whilst the rear section 04 forms the scalp of the animalian head. A facial component of the animalian character is shown for illustrative purposes, being the nose 15 of the front section 02 which is designed such that it abuts the top outer rim of the pot 16, and in conjunction with the snaps 08, ensures that the pot cover can remain secured in the upper rim of the pot 16.

Although the description above contains many specificities, these should not be construed as limiting the scope of the invention but merely as providing illustrations of some of the presently preferred embodiments of this invention. For example, the pot cover components can be attached to each other using other types of conventional clips or snap on fittings. The pot cover sections may be connected to a pot also via conventional clips or snap on fittings, or via a simple push-in jam fit. The animalian character so formed can be of different designs and shapes and colors. The join lines between the pot cover components can vary in shape and design, and the number of pot cover components can vary. The material used for construction can also vary, provided that it will create a suitable greenhouse effect when in use. Thus the scope of the invention should be determined by the appended claims and their legal equivalents, rather than by the examples given.

Operation

In operation one uses the invention in combination with any conventional pot. The sections of the pot cover connect together and can be connected and disconnected repeatedly, as required. The user firstly fills a standard pot with soil medium, and adds seeds and water to the soil. Then the user connects the sections of the pot cover together via conventional interlocking snap catches (or other conventional latching mechanism). The user then inserts the pot cover into the standard pot, so that it sits on top of the pot, with the bottom edge of the pot cover mounted flush inside the inner top rim of the pot. Various conventional clips and connections may be used to ensure that the pot cover remains securely connected to the pot. The user can, when desired, easily remove any or all sections of the pot cover. The rear section of the pot cover is (ideally) partially transparent, to allow light and heat to enter the pot, encouraging propagation of the seeds. The user can easily remove the rear section or sections of the pot cover to water the seeds as required, and then replace the rear section or sections of the pot cover to maintain the greenhouse effect. During the watering process, only removal of the rear section (or sections) of the pot cover is necessary and the front section (or sections) of the pot cover can remain connected to the pot inner rim, or alternatively can be also removed along with the rear section, and then reconnected once seed or plant maintenance is completed. Eventually, once the seeds have sprouted and the seedlings are of sufficient height, the user can permanently remove the rear section (or sections) of the pot cover and store elsewhere for a future seed propagation applications. The front section (or sections) can remain in place to maintain the semblance of an animalian character appearing to be living in a the pot. Emerging plant seedlings will begin to resemble new hair growth of the animalian character once they reach a suitable height. Alternatively, the user can remove all sections of the pot cover and re-use with a new pot containing seeds and soil requiring propagation.

There are many alternative ways that our pot cover may be implemented:

The pot cover may be an integral component/s of a pot or other container.

The pot cover, and by inference the animalian character, may be differently shaped.

The pot cover may be connected to various types of pots.

The pot cover may be comprised of one or more sections.

The pot cover sections may be fully or partially removable or alternatively may be relocatable to a different position (for example, an alternative means of removing the sections may incorporate a sliding section or a hinged sections to enable easy access)

The pot cover may be attached to a container other than a pot.

The pot cover may be connected to a pot by other conventional means instead of clips The pot cover components may be connected together by any other conventional means

We claim:

1. A plant pot growing enclosure for protecting growing seedlings comprising:
    a plant pot having a top edge;
    a concave top cover for forming a growing enclosure capable of supporting plant growth comprising:
        a front section having an indented recess extending continuously along a side edge of said front section, and at least two non-continuous recessed rims extending along a bottom edge of said front section, each non-continuous recessed rim having at least one associated connecting snap; and
        a rear section having a lip extending continuously along a side edge of said rear section, and a continuous recessed rim extending along a bottom edge of said rear section having at least two ends, each end having at least one associated hooked tab extending therefrom in a direction parallel to the lip; and
        wherein the front and rear sections are attached together by mating said indented recess with said lip in a coupling relationship, and by coupling said at least two connecting snaps with the at least two hooked tabs in a locking relationship, thus forming the concave top cover; and
        wherein said concave top cover is placed on the plant pot so that the non-continuous and continuous recessed rims both fit against an inside portion of said top edge and said concave top cover is supported on the top edge thus creating a growing enclosure; and
    said front section further comprising at least two apertures or windows, and an enlarged portion that extends over and below said top edge when the concave top cover is supported on said plant pot, wherein said at least two apertures and said enlarged portion are adapted to resemble facial features of an animal.

2. The plant pot growing enclosure of claim 1, wherein the front section is adapted to be supported alone on the top edge of the plant pot, while the rear section is removed therefrom.

* * * * *